(12) United States Patent
Moore

(10) Patent No.: US 7,053,775 B2
(45) Date of Patent: May 30, 2006

(54) RFID MATERIAL TRACKING METHOD AND APPARATUS

(75) Inventor: Scott E. Moore, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 181 days.

(21) Appl. No.: 10/229,483

(22) Filed: Aug. 28, 2002

(65) Prior Publication Data

US 2002/0196145 A1 Dec. 26, 2002

Related U.S. Application Data

(62) Division of application No. 09/371,717, filed on Aug. 9, 1999.

(51) Int. Cl.
*G08B 13/14* (2006.01)

(52) U.S. Cl. .............................. 340/572.1; 340/568.1; 342/42

(58) Field of Classification Search .............. 340/572.1, 340/572.8, 572.9, 568.1, 825.49; 342/42
See application file for complete search history.

(56) References Cited

U.S. PATENT DOCUMENTS

| | | | |
|---|---|---|---|
| 3,859,652 A | 1/1975 | Hall et al. .................... 340/280 |
| 5,063,380 A * | 11/1991 | Wakura .................. 340/825.49 |
| 5,099,227 A | 3/1992 | Geiszler et al. ............. 340/572 |
| 5,255,306 A | 10/1993 | Melton et al. ................. 379/38 |
| 5,402,104 A | 3/1995 | LaRosa |
| 5,424,858 A * | 6/1995 | Gillotte ....................... 398/108 |
| 5,433,096 A | 7/1995 | Janssen et al. |
| 5,539,394 A | 7/1996 | Cato et al. ............. 340/825.54 |
| 5,550,547 A * | 8/1996 | Chan et al. .................... 342/42 |
| 5,604,485 A | 2/1997 | Lauro et al. ................. 340/572 |
| 5,686,902 A | 11/1997 | Reis et al. ............. 340/825.54 |
| 5,689,238 A * | 11/1997 | Cannon et al. ........... 340/572.1 |
| 5,689,239 A | 11/1997 | Turner et al. ................ 340/572 |
| 5,747,786 A | 5/1998 | Cargin, Jr. et al. ......... 235/472 |
| 5,751,221 A * | 5/1998 | Stanfield et al. ............ 340/5.74 |
| 5,777,561 A | 7/1998 | Chieu et al. |
| 5,864,301 A | 1/1999 | Jackson .................. 340/825.54 |
| 5,914,671 A | 6/1999 | Tuttle ..................... 340/825.54 |
| 5,963,134 A | 10/1999 | Bowers et al. ........... 340/572.1 |
| 5,970,398 A | 10/1999 | Tuttle ...................... 455/193.1 |
| 5,977,875 A * | 11/1999 | Lin et al. ..................... 340/570 |
| 5,977,913 A | 11/1999 | Christ ......................... 342/465 |
| 5,986,570 A | 11/1999 | Black et al. ............ 340/825.54 |
| 6,028,518 A | 2/2000 | Rankin et al. ........... 340/572.1 |
| 6,037,879 A | 3/2000 | Tuttle ....................... 340/10.4 |
| 6,097,292 A | 8/2000 | Kelly et al. |
| 6,104,291 A | 8/2000 | Beauvillier et al. |
| 6,144,332 A | 11/2000 | Reindl et al. .................. 342/42 |
| 6,150,921 A | 11/2000 | Werb et al. ................. 340/10.1 |
| 6,184,777 B1 | 2/2001 | Mejia |
| 6,204,764 B1 * | 3/2001 | Maloney .................. 340/568.1 |
| 6,211,781 B1 | 4/2001 | McDonald |
| 6,211,799 B1 | 4/2001 | Post et al. ..................... 341/33 |
| 6,219,543 B1 | 4/2001 | Myers et al. |
| 6,236,223 B1 | 5/2001 | Brady et al. |
| 6,236,316 B1 | 5/2001 | Eberhardt et al. ........ 340/572.7 |
| 6,249,227 B1 | 6/2001 | Brady et al. ............. 340/572.1 |
| 6,259,353 B1 | 7/2001 | Berger et al. |
| 6,317,027 B1 | 11/2001 | Watkins ..................... 340/10.1 |
| 6,351,215 B1 | 2/2002 | Rodgers et al. .......... 340/572.1 |
| 6,476,708 B1 | 11/2002 | Johnson |
| 6,600,420 B1 | 7/2003 | Goff et al. ................ 340/572.4 |

* cited by examiner

*Primary Examiner*—John Tweel, Jr.
(74) *Attorney, Agent, or Firm*—Schwegman, Lundberg, Woessner & Kluth, P.A.

(57) ABSTRACT

A method and apparatus for tracking items automatically is described. A passive RFID (Radio Frequency IDentification) tag is used with a material tracking system capable of real-time pinpoint location and identification of thousands of items in production and storage areas. Passive RFID tags are attached to the item to be tracked, remote sensing antennas are placed at each remote location to be monitored, interrogators with several antenna inputs are connected to the sensing antennas to multiplex the antenna signals, and a host computer communicates with the interrogators to determine item locations to an exacting measure.

38 Claims, 15 Drawing Sheets

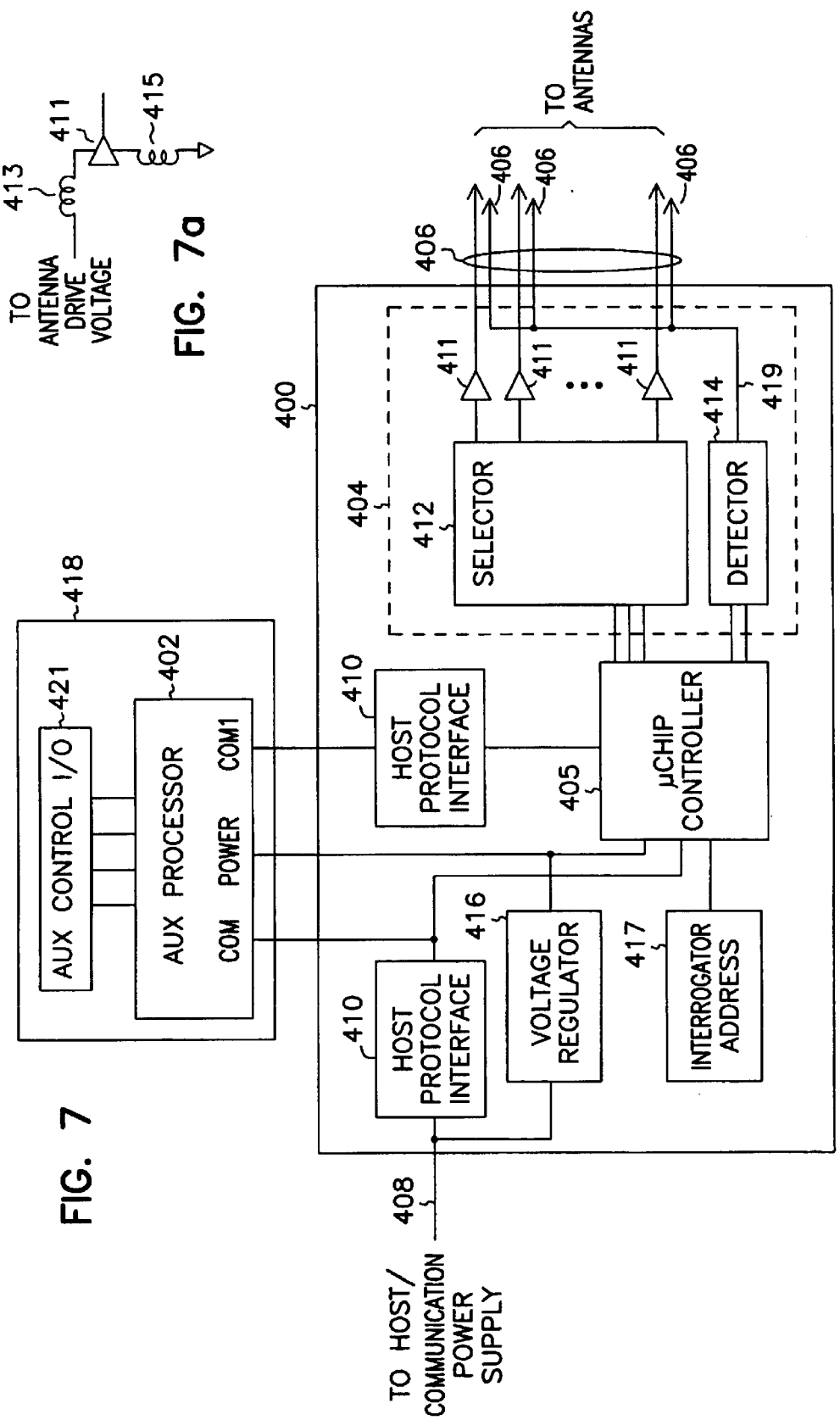

RFID MATERIAL TRACKING METHOD AND APPARATUS

CROSS-REFERENCE TO RELATED APPLICATION(S)

This application is a division of U.S. patent application Ser. No. 09/371,717, filed on Aug. 9, 1999, now U.S. Pat. No. 6,714,121, the specification of which is incorporated by reference herein.

FIELD OF THE INVENTION

The present invention relates generally to radio frequency identification, and more specifically to a tracking system, method, and components for use with radio frequency identification.

BACKGROUND OF THE INVENTION

Numerous systems exist for the physical tracking of inventory, raw materials, materials in manufacture, or other items in a variety of locations, such as manufacturing facilities, libraries, offices, and the like. Accurate and inexpensive locating, tracking, and inventorying of the physical location of items such as parts, goods, and materials is a necessity for many operations, such as manufacturing and warehousing, for a number of reasons. Such reasons include the desire or need to quickly determine the physical location of a part in the manufacturing process, or to determine whether a part is present in inventory or storage, to determine the quantity of an item on hand, to track the progress of an item in manufacture, and many other such functions.

Apparatuses and methods for the performance of the tracking of material and the performance of inventory-like processes have evolved over time. For example, inventory strategies have been modified from the hand tallying of stock and location in a notebook or the like, to sophisticated computer driven hardware and software for tracking inventory. Traditionally, a full inventory operation could close an entire facility, such as a retail store, warehouse, or manufacturing plant, for a day or more every time a detailed inventory was required. The large costs associated with physically shutting down an operation to do inventory were and are a known cost of the operation of many businesses.

An accurate record of the items available in a store or warehouse, as well as their location, is a key component of successfully operating a business. Knowing what is on hand allows the skilled manager or supply personnel to make informed ordering decisions. Knowledge of the availability and location of items or parts in a facility decreases the amount of time necessary for retrieval of such items, thereby increasing overall efficiency.

The advent of computers, and their rapid entrenchment into mainstream businesses and personal life, has also led to an advent in tracking items and performing and maintaining an inventory. For example, when physical inventory was still routinely performed by hand, a database could be created and maintained to track inventory in a more dynamic fashion. The potential errors of misplacing the physical inventory sheet, and the potential corruption of the physical inventory record were replaced with the increasingly lower incidence of potential errors of lost data and data corruption. Data entry error still also posed potential human error problems. Still, the computerized storage and retrieval of inventory information allowed for various sorting and categorization of data not previously easily available. The database functions of hand entered computer inventories were readily extended to other material tracking endeavors such as warehousing, stocking, ordering, and the like.

As technology continued to advance, various apparatuses and methods for tracking the inventory of a retail store, manufacturing plant, warehouse, and the like, in real-time or near real-time, were placed into use. Production lot tracking technology systems had and have widely varied capability, success, ease of use, and cost. Currently proposed and available lot tracking technologies include manual keyboard entry, bar coding, and proprietary systems such as those provided by JENOPTIK, Fluoroware, Micron Communications, Inc., and Omron.

Manual keyboard entry of lot numbers of parts in a lot tracking or inventory situation is already in use in many facilities. Such systems are not automated, but instead are manually performed. The physical inventory process is still undertaken, and generally the information gathered is entered into a computerized database. Data entry errors due to human error are in large part an unavoidable part of the manual inventory process. Such errors are difficult if not impossible to track and correct. Any information which is desired or required to be obtained and stored or entered into a computer or other system beyond a simple inventory creates additional work for the inventory taker. The time it takes to perform an inventory using manual keyboard entry of lot numbers and the like is not significantly less than traditional pencil and paper inventories which often require the full or at least partial shutdown of an entire facility. Such an inventory process is subject to high costs reflected not necessarily in terms of equipment, but in terms of employee-hours and lost revenues from a shutdown.

Because of its advantages over manual inventory, whether using a computer for further organization or not, bar coding has become commonplace in many if not most retail outlets and warehouses, grocery stores, chains, and large retail outlets. In a bar coding scheme, an identifying label containing encoded information is placed on the goods, parts, part bin, or other item to be identified by a bar code reader. The encoded information is read by the reader with no user data entry generally required. This is referred to as keyless data entry. The information encoded on the bar code is then typically passed to a computer or other processing medium for decoding and data entry. Such data entry is largely error free due to the decreased reliance on error-prone human activities. Bar code data entry is also typically faster than manual data entry.

Bar coding is a common and easy to implement technology. However, bar coding requires a scanner or reader for every terminal, or a portable scanner which is moved around from location to location. Further, bar coding requires a separate label for implementation. Without further data entry, which has additional associated costs and potential error factors, other desired or required information such as an exact location of the scanned item is unknown.

Another type of lot tracking system uses an infrared lot box micro terminal with a pager-like display for lot tracking. A micro terminal is physically attached to each lot box. Each micro terminal communicates via infrared communication with an infrared (IR) transceiver grid, which must be in sight of the micro terminal in order for the system to function properly. Typically, the IR transceiver grid is positioned or installed along the ceiling of a facility. Stacked pallets, lots, or wafer boats will be unreadable using an IR system. The micro terminals and IR transceiver grid of the IR system are expensive. A micro terminal system requires an elaborate software platform, but does allow for reduced data entry error, faster data entry, and simple user entries. The IR system requires a major procedural change in the standards for performing lot tracking. The micro terminals must also be positioned in a specific orientation with respect to the transceiver grid for proper functioning. The terminal must be physically attached to a lot box to be tracked. Lot location can only be identified to an area as small as the IR field of view.

Another lot tracking system is available from Fluoroware. This system uses passive tags in a cassette. The passive tags are scanned by a scanning station over which an item, wafer boat, or lot which has been tagged passes. The item, lot, or boat is identified when it passes over the scanning station. Often, wafer boats are specific to the particular station, but parts may be moved to a number of different locations. Tracking a cassette may require a large amount of reassociation of the tag information to accurately track the part or item. The scanning stations of the Fluoroware system are expensive, on the order of $2,000-$3,000 per station. Additionally, a main computer to centralize, organize, and coordinate operation of the tracking system is required. The Fluoroware system, like other more automated systems, reduces data entry error and data entry time. The tags used in the system are relatively low in cost, and can be embedded into boats. However, many controllers are needed for the system, and the scanning stations have a high cost. Further, the reassociation of tags with different locations requires extra data entry or tag reprogramming, which introduces further potential errors.

When an inventory or lot tracking system works with a large number of parts or locations, which may number into the thousands of locations and many thousands if not millions of parts, the systems described above become unwieldy to effectively operate, become cost prohibitive, or both. Further, with a large number of parts and locations, an exact location match is difficult if not impossible to provide with the above systems. Such a lack of ability to pinpoint the location of a part further hinders the operation and effectiveness of the above systems.

Additionally, items or lots in a manufacturing facility may sit in a certain location without being used or moved for weeks or more. In addition, the pallets of wafer boats in such a facility or storage area may be stacked in stacks five or more layers deep. Personnel are often assigned to physically search all lots to find a lot which may be missing. Lots in large manufacturing facilities have been known to be lost for 6 months to a year. A more accurate tracking system for lots would be desirable.

In manufacturing situations, other tracking of inventory and parts is often desirable or necessary. Such other tracking may include tracking the amount of time a part spends between stations, the amount of time it takes for a part to complete a certain operation, a history of the travel of a part from start to finish of a manufacturing or fabrication operation, and the like.

SUMMARY OF THE INVENTION

The present invention solves the above-mentioned problems in the art and other problems which will be understood by those skilled in the art upon reading and understanding the present specification. The present invention provides a method and apparatus for tracking items automatically. An apparatus embodiment of the present invention is a passive RFID (Radio Frequency IDentification) tag material tracking system capable of real-time pinpoint location and identification of thousands of items in production and storage areas. Passive RFID tags are attached to the item to be tracked, remote sensing antennas are placed at each remote location to be monitored, scanning interrogators with several multiplexed antenna inputs are connected to the sensing antennas, and a host computer communicates with the interrogators to determine item locations to an exacting antenna position.

Another embodiment of the present invention is a method for tracking the location of an object having an identification tag attached to or near the object, using an interrogator connected to a sensing antenna and to a computer, comprising activating the sensing antenna, determining if there is a voltage at the sensing antenna, obtaining data from a passive identification tag attached to the object, and communicating between the host computer and the interrogator to log tag location data.

Still another embodiment of the present invention is an RFID material tracking system, comprising a plurality of RFID tags, each tag attachable to a container or an item to be tracked, a plurality of sensing antennas, each antenna placeable at a location to be monitored, a plurality of interrogators, each interrogator having a plurality of antenna inputs, each of the plurality of sensing antennas connected to an interrogator, and a computer operatively connected to each of the interrogators and receiving tag location information therefrom to log tag location data.

BRIEF DESCRIPTION OF THE DRAWINGS

In the drawings, where like numerals refer to like components throughout the several views.

FIG. 7 is a block schematic diagram of an embodiment of an interrogator of the present invention;

FIG. 7a is a schematic diagram of an RF harmonic reduction embodiment of the driver system;

DESCRIPTION OF EMBODIMENTS

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The physical similarities between inventory operations and other similar operations such as warehousing, quantity and position tracking, and the like allow the discussion of one such operation to generalize for a number of similar operations. As such, this description will discuss generally a variety of inventory strategies, with the understanding that generalization to other operations may easily be accomplished by one of ordinary skill in the art. Such modification and specification are therefore within the scope of the present invention.

Physical Overview

Figure 1A:
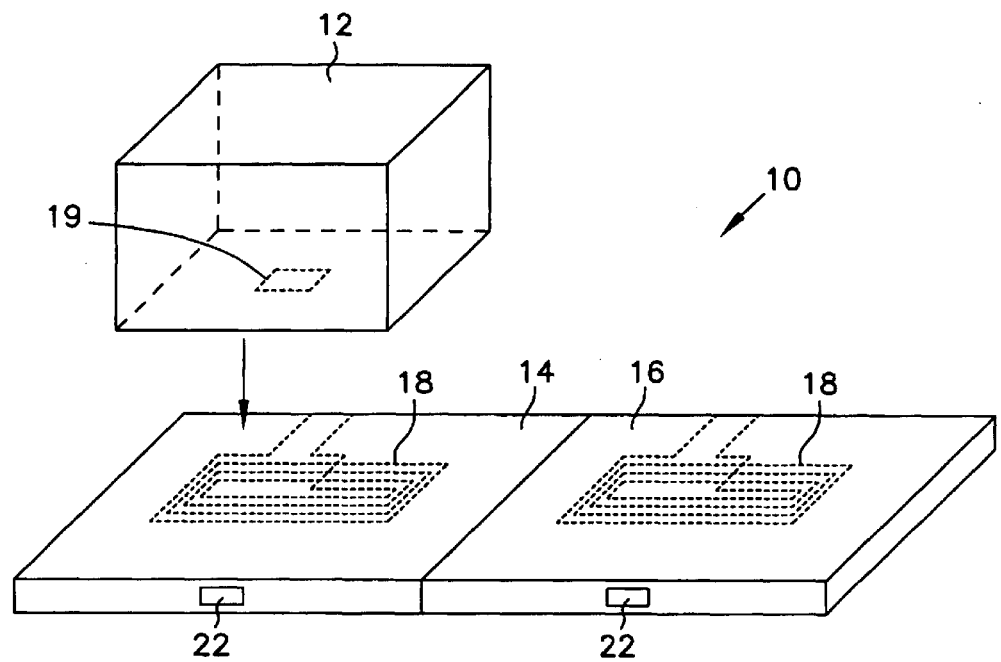
FIGS. 1A and 1B are perspective drawings of a dual nesting station with a container having an RFID tag embedded therein.
Figure 1B:
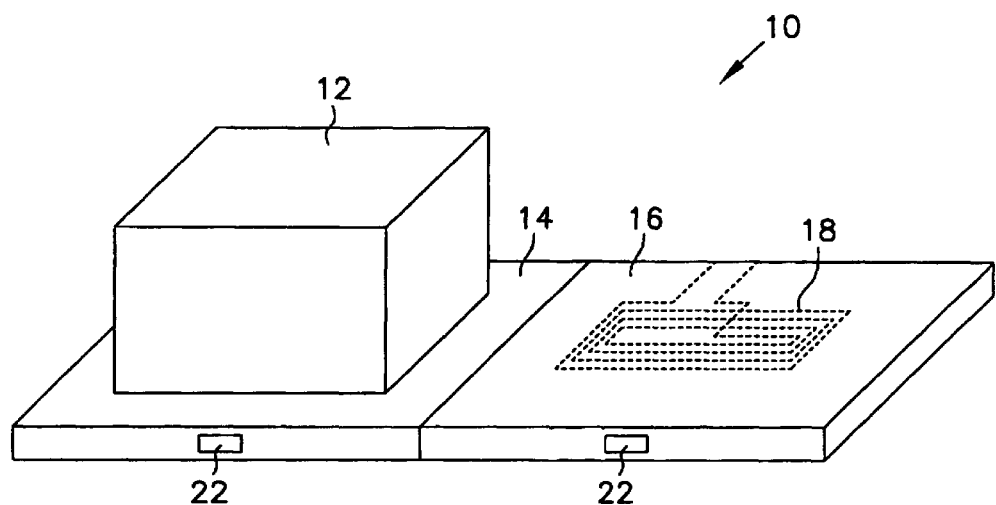
Figure 2:
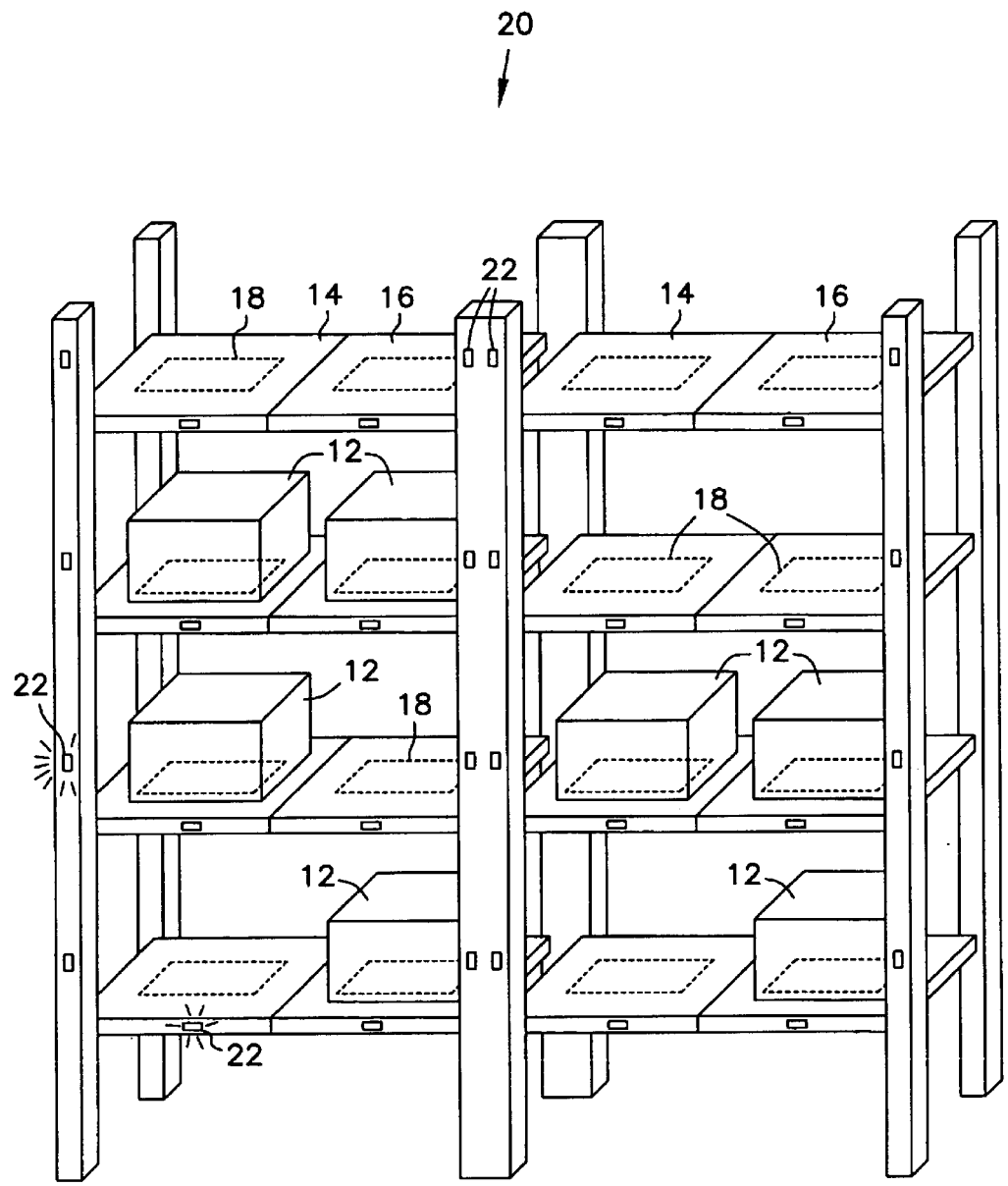
FIG. 2 is a perspective view of a storage shelf having a plurality of nesting stations with some tracked container placed thereon.

An implementation of a portion of a container tracking and identification system according to the present invention is shown in FIGS. 1A, 1B and 2. Referring to FIG. 1, a dual nesting station 10 is shown upon which an item or container 12 may be placed. Hereafter, reference to container will mean any item which may be tracked by the present invention. The dual nesting station contains two locations 14, 16 where containers may be placed and tracked according to the present invention. A dual nesting station 10 is shown as an exemplary embodiment, however, those skilled in the art will readily recognize that a single nesting station 14 may be implemented, or any plurality of nesting stations may be implemented in accordance with the teachings of the present invention. The nesting stations 14, 16 may be implemented as a generally flat component which may be placed wherever there is a need to track a container, or it may be formed as an integral part of a shelf, pallet, bench, table, or any other location where items or containers are located.

Each nesting station includes an antenna 18 imbedded within of upon each nesting stations 14, 16. Other circuitry, not shown in FIGS. 1A and 1B but described below, is used to send and receive signals to and from an RFID tag 19 imbedded within or placed upon container 12. As shown in FIG. 1A, when container 12 is placed in proximity to nesting station 14, communication of signals between container RFID tag 19 and antenna 18 is possible. These communication signals will be more fully described below.

FIG. 2 shows an exemplary implementation of a shelf arrangement 20 with which the present invention may be used. A plurality of nesting stations 16 are part of the shelf arrangement with each nesting station 16 having an integral antenna 18 for each shelf location. Containers 12 or other items to be tracked, can be placed at various shelf locations and the containers 12 can be located, identified, tracked, etc., with the teaching of the present invention. An optional feature of the present invention are the use of annunciators or indicators 22 which may be used to indicate the location of a desired container. Nesting stations 16 may be placed upon the shelves or they may be integrated with the shelf itself.

System Overview

Figure 3:
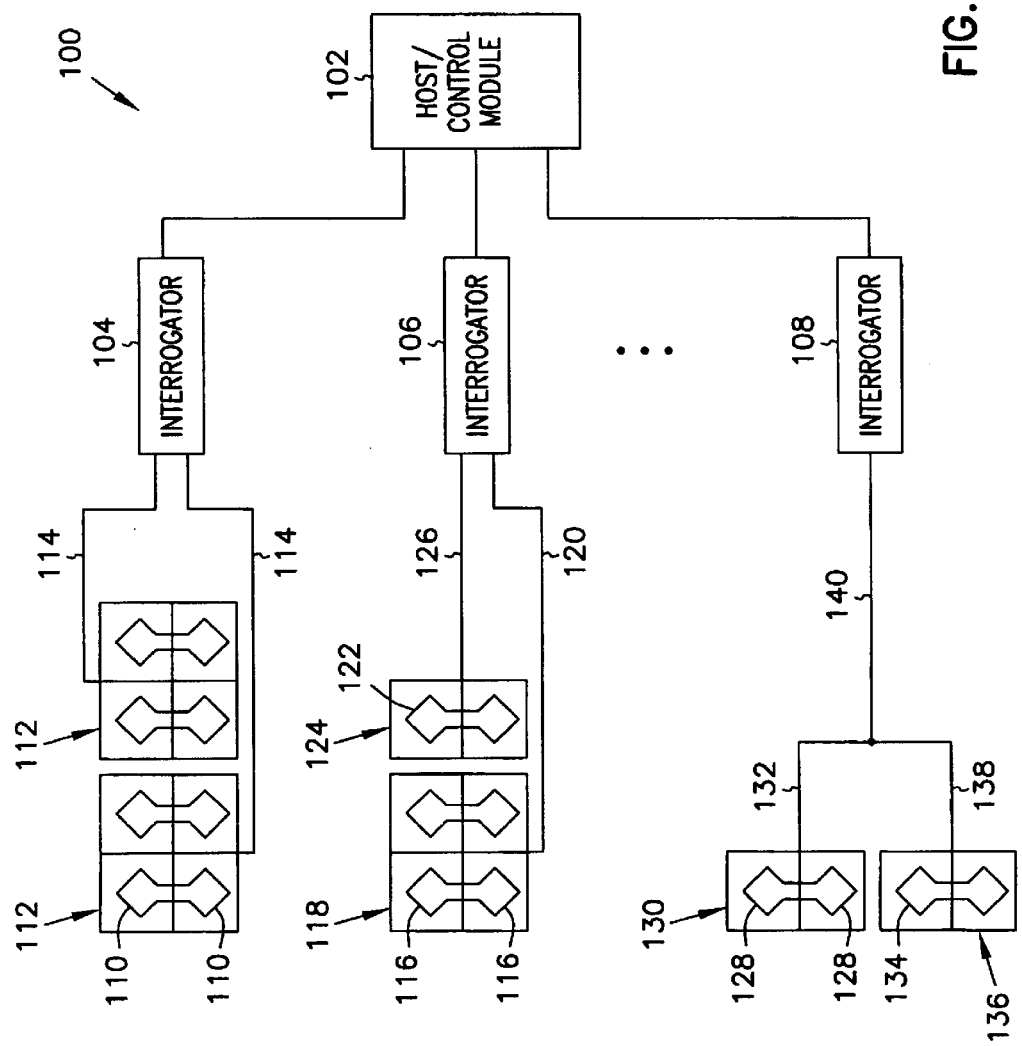
FIG. 3 is a block diagram view of a system embodiment of the present invention.

Referring now to FIG. 3, an embodiment 100 of a system of the present invention is shown in block diagram. Lot tracking system 100 comprises a host or control module 102 operatively connected to a plurality of interrogators 104, 106, and 108. The interrogators 104, 106, and 108 each have a plurality of sensing antennas and circuitry 110 operatively connected to the main interrogator body by connection lines. The interrogators 104, 106, 108, are preferably local to the sensing antenna circuits 110. The sensing antenna circuits 110 are positioned so that they are in sensing proximity to a location at or over which a plurality of containers may be located or pass. Each container (shown in FIGS. 1A, 1B and 2) is capable of holding items such as lots of wafers used to manufacture integrated circuits. In such an application of the present invention, the container is termed a "boat" and would hold lots of partially fabricated or fully fabricated wafers which may be routed through the plurality steps required in the IC fabrication at an IC foundry.

Each container has an attached Radio Frequency IDentification (RFID) tag 19 (shown in FIGS. 1A, 1B and 2) capable of being excited by the sensing antenna circuits 110, capable of relaying, conveying, or communicating identification information to the sensing antenna circuits, and on to the control module 102.

The tags are preferably low frequency passive RFID tags 19 which carry a serial number or identification number which can be cross-referenced within a database or other data structure maintained by the control module 102 or one of its components. Each interrogator 104, 106, and 108 contains drive electronics and detection circuitry to excite and read back identification information contained on a tag. Driving information is communicated to the tag through the antenna coil or primary of an electromagnetically coupled circuit. The data out on the communication line 114, 126, 140 is linkable to the host or control module system for other action. Tags are polled by exciting the sensing antenna circuits 110, which induces a current in the tag 19, causing it to communicate its stored information, which will be described in more detail below.

The RFID tags 19 contain generally simple information, but the tag information may be as widely varied as the uses for the system 100 itself. For example, tags can contain simple presence/no presence bit, or detailed information regarding an entire build process, or specifications about lot number, serial number, and the like. The radio frequency of the interrogator powers up the tag, and the carrier frequency (usually 125 KHZ for passive tags in one embodiment) becomes the clocking frequency to generate a clock to clock the data out. Passive tags can be made and used very inexpensively, making them more economical for use with multiple read locations.

In one arrangement shown in FIG. 3, interrogator 104 is operatively connected to a plurality of sensing antenna circuits 110 on a nesting station 112 via connection lines 114. In this arrangement, two quad-nesting stations are shown. In another arrangement, interrogator 106 is operatively connected to a plurality of sensing antenna circuits 116 on quad nesting station 118 via connection line 120, and to antennas 122 of dual nesting station 124 via connection line 126. In yet another arrangement, interrogator 108 is operatively connected to a plurality of antenna circuits 128 on a dual nesting station 130 via connection line 132, and to antenna circuits 134 on another dual nesting station 136 via connection line 138. Further interrogators may be added to the embodiment 100 to accommodate more nesting stations.

Control module 102 may include such components as a computer with a database of information pertaining to lot numbers, lot locations, and other lot information for the items in container 12. Control module 102 controls the interrogators 104, 106, 108 to poll appropriate locations to gather and maintain information about containers 12.

The connection lines of embodiment 100 may comprise a plurality of types of connections such as standard flat phone cables with a phone jack connector to attach to multiple sensing antennas. Depending upon the configuration of the nesting station to which the connection lines are connected, the telephone cables used in embodiment 100 may be four conductor flat phone cables, eight conductor flat phone cables, or a combination of such cables. The connector phone jack may be an RJ-11 type four conductor jack, or an RJ-45 type eight conductor jack, depending upon the type of cable connection. Flat telephone cable is used so that the drive signals for the antenna circuits (described below) are physically separated from the sense line and are readily available at low cost.

Alternatively, twisted pair cabling may be used in a network environment. In such a configuration, the detection and ground wires (described below) would be twisted together, and the drive signal lines would be twisted together. Only one drive wire is active at any one time. One antenna circuit 110 is driven at a time, and a common detection circuit is used for all of the antennas. The drive signal is switched from one antenna circuit to the next using a multiplexor (MUX). The switching may be sequential, ordered, or random, but only one antenna circuit 110 is driven at any one given time. This allows the use of a common detection processor detection circuit which is used for each antenna circuit of the plurality of antenna circuits that are wired into each interrogator. The multiplexor selects which antenna circuit is being driven by the drive signal.

The jacks for the connection can be standard telephone connection jacks, selected for their availability and low cost. Those skilled in the art will readily recognize that a wide variety of wire types, wiring configurations and electrical connectors may be used in the implementation of the present invention without departing from the spirit and scope of the present invention.

Nesting stations have been described above as single-, dual- or quad-, but many other arrangements of nesting stations is possible with the present invention. For the example of tracking boxes of semiconductor wafers, each nesting station would be typically implemented as a dual nesting station sized to be approximately one foot by 2 feet to form a suitably sized location for two typical 200 millimeter wafer boxes which have a footprint of approximately one square foot. This is referred to as a 1×2 pad. A 2×2 pad would be implemented as a quad nesting station described above and would be approximately two feet by two feet in size. Thus, a 2×2 would be a quad nesting station for four semiconductor wafer boxes.

For a 1×2 pad nesting station such as nesting station 124, 130, or 136, an RJ-11 four conductor jack may be used to connect the four conductor telephone cables 126, 132, and 138, respectively, to the antenna circuits 122, 128, and 134 respectively. For a 2×2 pad nesting station such as nesting station 112 or 118, an RJ-45 eight conductor jack may be used to connect the eight conductor telephone cable 114 or 120 respectively to the antenna circuits 110 or 116.

Alternatively, instead of an eight conductor cable such as cable 114 or cable 120, two four conductor cables can be used side by side in an RJ-45 jack. In this case, the opposite ends of the four conductor cables may be fitted with RJ-11 phone jacks for ease of connection. This configuration is useful for connection of two 1×2 pads such as pads 130 and 136 to a single interrogator such as interrogator 108. For example, in FIG. 3, cables 132 and 138 may be four conductor telephone cables, each having an RJ-11 jack for connection of the cables to the nesting stations 130 and 136. The two cables 132 and 138 plug into a single RJ-45 eight position jack to connect the cables to interrogator 108. When two four connector cables are used in a single RJ-45 eight conductor jack, they are mirrored so as to place the detector circuit, that is the signal that has been rectified and has the greatest noise sensitivity, on the outside of the cable where it is furthest from the drive electronics.

Nesting Pad Description

Figure 4:
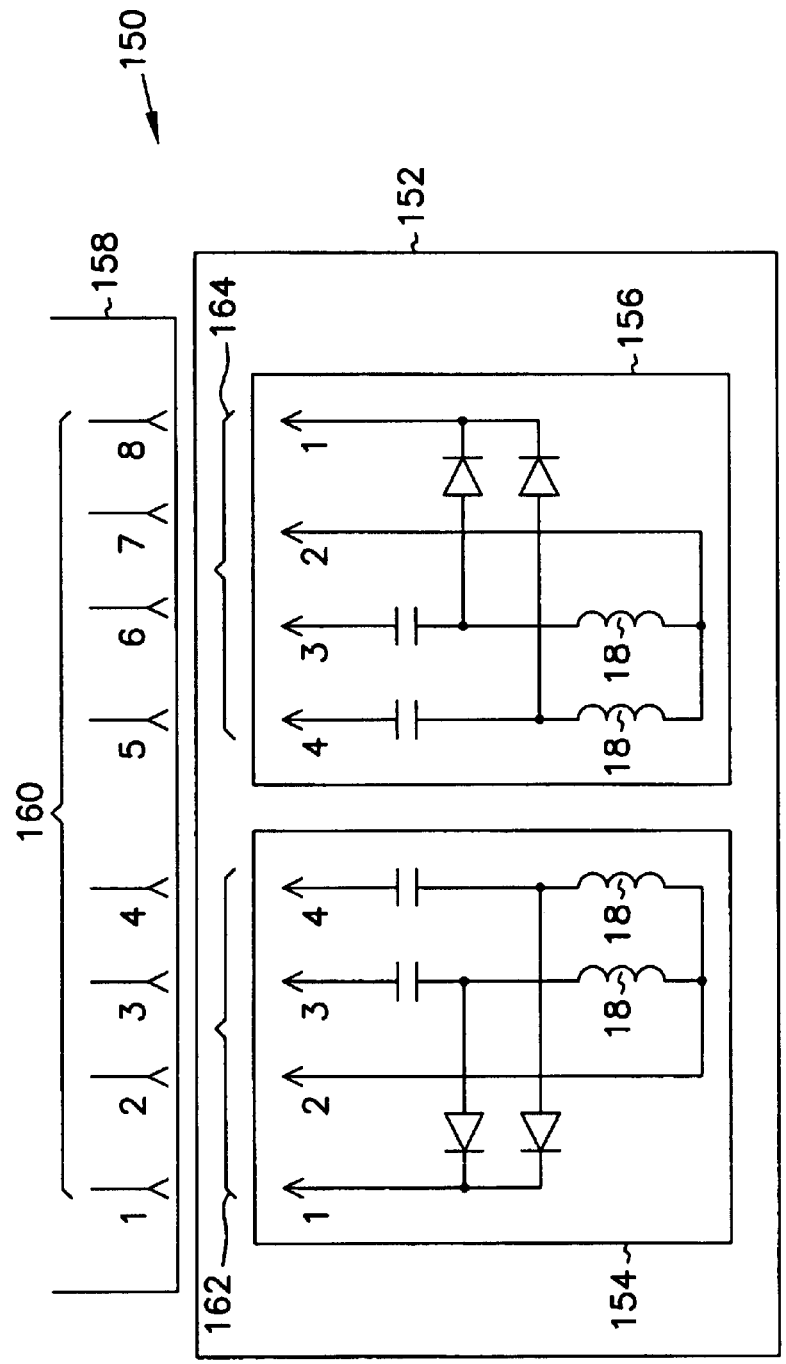
FIG. 4 is a schematic diagram of an embodiment of a circuit layout for a 2×2 pad embodying the invention.

FIG. 4 shows an exemplary embodiment of a 2×2 pad 152 implemented with two 1×2 pads 154 and 156, along with the antenna circuitry, arranged in a mirrored configuration (discussed below) in schematic diagram form. A connection 158 for cabling to the interrogator has eight contact positions 160 which may comprise two four conductor RJ-11 jacks, or a single eight conductor RJ-45 jack as described above. Each 1×2 pad 154 and 156 has a four conductor RJ-11 jack connecting its four contact positions, 162 and 164 respectively, to an appropriate four conductor cable to the interrogator. As shown, the physical layout of contact positions 162 mirrors that of the physical layout of contact 164, with position 162-4 and position 164-4 being adjacent within the 2×2 pad 152. This mirrored configuration places the detection circuit, that is the rectified signal with the greatest noise sensitivity, on the outside of the cable. The detector conductors (position 1) are therefore placed away from the drive signal conductors (positions 3,4) by the ground conductors (position 2) to help eliminate noise.

The antennas used in embodiment 100 preferably each comprise a flat coil, a flat radial single layer antennas comprising a length of copper wire which is coiled to form an antenna. The flat coil construction allows some degree of side to side movement of the antenna without significant degradation of performance. Further, the flat coil antenna construction also provides relatively good height detection of the antenna without drastically affecting the performance of the system. A flat coil is less sensitive to surrounding metal surfaces in the same plane as the coil. Other antennas could also be used. Representative embodiments of antennas will be discussed further below.

Antenna Circuit Description

Figure 5:
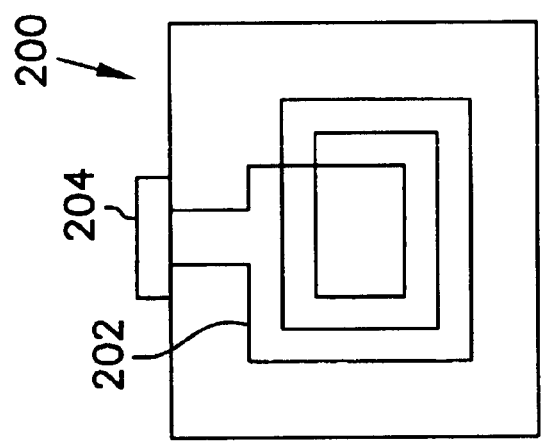
FIG. 5 is diagram of an embodiment of an antenna suitable for use in the embodiment of claim 1.

FIG. 5 shows a top view of a representative embodiment of a flat antenna coil 200 is shown in FIG. 5. Antenna coil 200 comprises a length of coiled wire 202, such as copper wire. Although copper wire is preferred, other conductive wires and embodiments are well within the scope of the invention, as will be known by one of skill in the art.

Figure 5A:
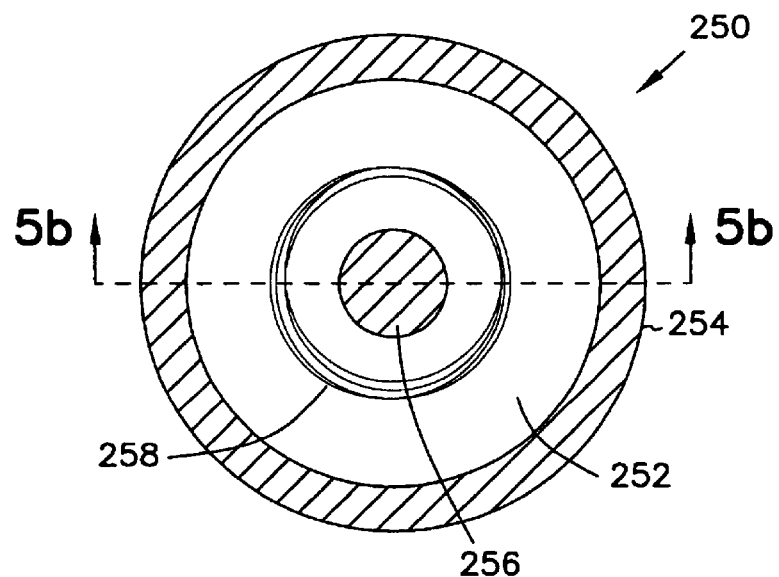
FIG. 5a is a top view of another embodiment of an antenna suitable for use in the embodiment of claim 1.
Figure 5B:
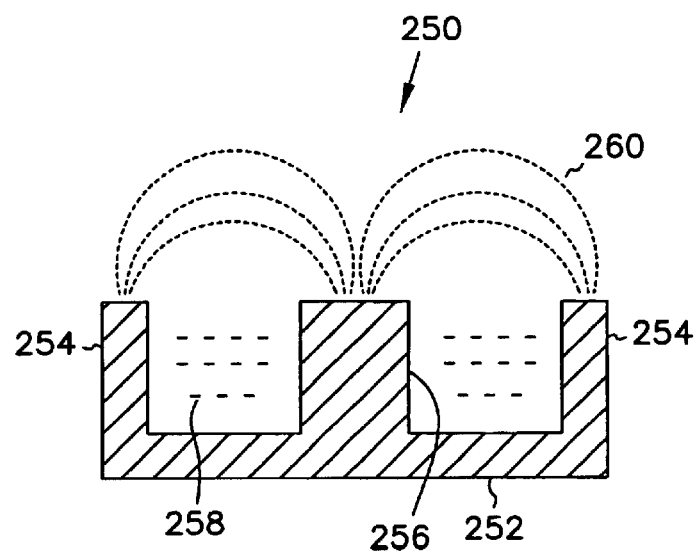
FIG. 5b is a section view of the embodiment of FIG. 5a taken along lines 5b—5b thereof.

FIG. 5*a* shows a top view of another embodiment 250 of an antenna. Antenna 250 comprises a substantially circular magnetic core 252 having an annular ring 254 extending from the core 252 to form a magnetic cup. A magnetic center post 256 extends from the core 252 approximately at the center of core 252, in the same direction as the annular ring 254. Coil windings 258 are wrapped around the center post 256. FIG. 5*b* shows a section view of antenna 250 taken along lines 5*b*—5*b* of FIG. 5*a*. FIG. 5*b* shows focused flux lines 260 from the focused antenna 250.

Figure 6:
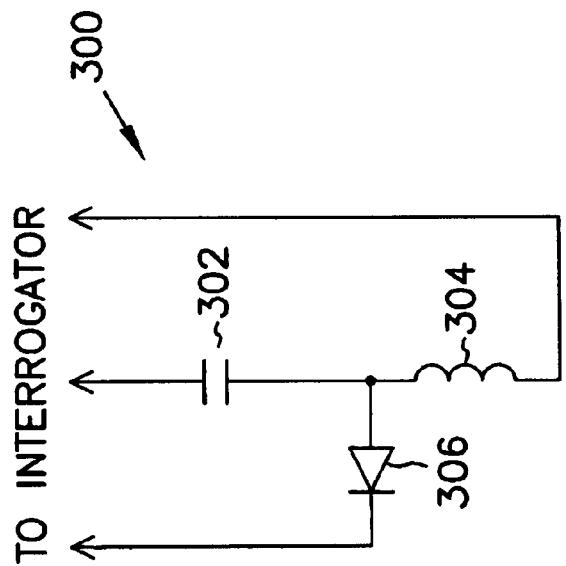
FIG. 6 is a circuit diagram of an embodiment of a tuned circuit according to the invention.

As shown in FIG. 6, each antenna circuit 300 form a tuned tank circuit which is connected to interrogators 104, 106, and 108. The interrogators contain circuitry for excitation of the tuned tank circuits and for detection of the information transmitted by an excited RFID tag. Since the nesting stations are somewhat remote from the interrogators, the tuned circuit embodiment 300 of the present invention places a capacitor 302 in close proximity to the antenna coil 304, so that the entire tank circuit 300 is remote. Therefore the cable length and type can vary or be changed without affecting the operation of the antenna 304 and drive electronics.

One skilled in the art will recognize that if the capacitive element and the antenna coil were separated, with the capacitive element located at an interrogator would require that the interrogator be part of the tuned circuit. Cabling between the antenna (nesting station) and the capacitive element (interrogator) would be a factor in deciphering information from any excited tag. In such a configuration, when the location of the antenna changed, the tuning of the circuit changed. This latter configuration would be problematic since tuning the tank circuit for proper operation would be time consuming. By placing the entire tank circuit in the nesting station, the components of the system are readily interchangeable and cabling lengths are not a factor in the proper operation.

In operation, the interrogator drives the tuned tank circuit comprised of series connected elements 302 and 304 with a square wave power signal. In an exemplary embodiment, the drive signal operates at 125 kHz, capacitor 302 is 3000 picoFarads and antenna coil 18, 202, or 304 is 800 micro-Henrys. The square wave drive signal is smoothed to a nearly sine wave signal which is emitted from the antenna coil 304 to excite RFID tag 19. The excited tag emits a signal containing information unique to the tag (such as a serial number). This signal from the tag is detected by antenna coil 304, rectified by diode 306 and sent to the interrogator for demodulation. The diode 306 generates a rectified peak voltage of the tank circuit 300 and the detected signal appears as a pulse stream in the form of a series of dips in the 125 kHz rectified carrier signal. This pulse stream is then decoded by the interrogator for the data it carries.

Interrogator Description

An embodiment 400 of an interrogator is shown in FIG. 7 which includes a processor 405 and an antenna reader circuit 404. Antennas are connectable to the interrogator 400 at connection point 406, and connection to the power supply and host or control module is effected at point 408. Power for operating the interrogator 400 may be obtained locally or it may be received through the host communication cable. Communication of processor 405 with host or control module 102 is accomplished through port 410. Host protocol interface port 410 may be a serial communication RS-232 port, or a differential port such as a multi-drop IEEE 485 or non multi-drop IEEE 422. The host or control module processes instructions according to a predefined operational structure, issuing commands to the interrogator for control of multiplexor 412 which selects the antenna which is to be driven at any given time.

In the exemplary embodiment shown in FIG. 7, each antenna connected to the interrogator 400 has a dedicated power driver 411 circuit to generate the square wave excitation signal. The preferred power driver for the antennas is a low cost CMOS power driver to drive the square wave which is converted to a sine wave by the tuned circuit. In this example, each antenna has its own power driver within the interrogator because an electronic multiplexor switch with a low on resistance would be more expensive than the CMOS drivers. It is desirable to use power drivers with fast rise times, such as MOSFET and CMOS power drivers.

Details of the power driver circuitry are shown in FIG. 7a. Drivers 411 have a fast rise time and radiate a high frequency harmonic because of that. To slow the rise time, drivers 411 are each connected to the antenna drive voltage through an inductor 413. Further, an inductor 415 is electrically interposed between each driver 411 and ground. The inductors 413 and 415 are used to slow the rises and fall times of the driver 411 to reduce harmonic radiated RF.

Once the sensing antennas have excited a tag, the information received from tank circuit such as circuit 300 is sent to interrogator 400 and detected by detector 414 along a sense line 419. Since only one antenna is excited at a time, all detector sense lines 419 from all nesting stations may be wired to the same detector. Processor or microchip controller 405 decodes data from the detector circuit 414 and can provide for sequential, ordered, or random scanning of the ports of the system through antenna selector 412.

Detector circuit 414 is preferably implemented with analog amplification/detection of the DC rectified signal of the diode of the tuned circuit. The detected signal can be provided to processor 405 where each detection circuit 414 also has decoding capabilities, such as digital signal processing (DSP) type decoding built in. Each multiplexor board could have its own detector and processor, allowing for the driving of multiple antennas at once.

The processor 405 of interrogator 400 can be essentially a microcomputer, that is an all in one chip with on board RAM, EPROM, I/O points, a microprocessor, and analog input. The processor 405 could have hard-coded (burned into PROM) control software, or it could download the control software from a separate processor or computer system.

The interrogator 400 is preferably positioned in close proximity to the sensing antenna, which reduces the bundle of wires that must be run from the interrogator to the host computer or control module. From the interrogator, a low cost serial port may be used to run power into the interrogator along a communication line from the host. This allows for a wide operating voltage, which is preferably maintained low (24V for example) for safety purposes, but high enough that there is a low current draw. In this exemplary implementation, there is only one cable which needs to be disconnected in the event that the interrogator must be moved. In some environments, this a fairly common event. Referring back to FIG. 2, a single interrogator may be located on the shelving units and serving all nesting stations of this shelf unit. If the shelf is to be moved, only one cable need be disconnected from the host. That cable may be a wall jack with in-the-wall network wires running to the host.

To keep the efficiency of the system up and power current down, voltage regulation circuitry 416 is used to perform regulation of unregulated 24V power to regulated 12V and 5V power. In one embodiment, DC to DC voltage regulators are used to perform main power reduction from an unregulated 24V power supply to a regulated 12V and 5V power supply to drive the interrogator components.

Alternatively, communications coming through host protocol interface 410 could be jumpered to an auxiliary processor board 418 that may contain an auxiliary processor 402 and wide variety of optional communication or I/O protocols 421, such as ETHERNET, wireless modem, another processor with a large amount of memory, or the like. In such a configuration, the entire interrogator system 400 runs without interaction between the interrogator and the host. Gathered information may be downloaded to the host or control module at a later time. If no auxiliary processor 402 is present, then the connections which would go to the COM and COM1 ports of the auxiliary processor 402 are jumpered together.

A wide variety of auxiliary functions could also be performed by such an auxiliary control I/O 421 piggybacked to the circuit 404. A daughterboard 418 with auxiliary input/output capability could be used to unlock doors, generate alarm signals, including local alarm signals for an object removed from a nesting station or boat, or the location from which an object has been removed, or drive an operator interface display terminal.

Figure 8:
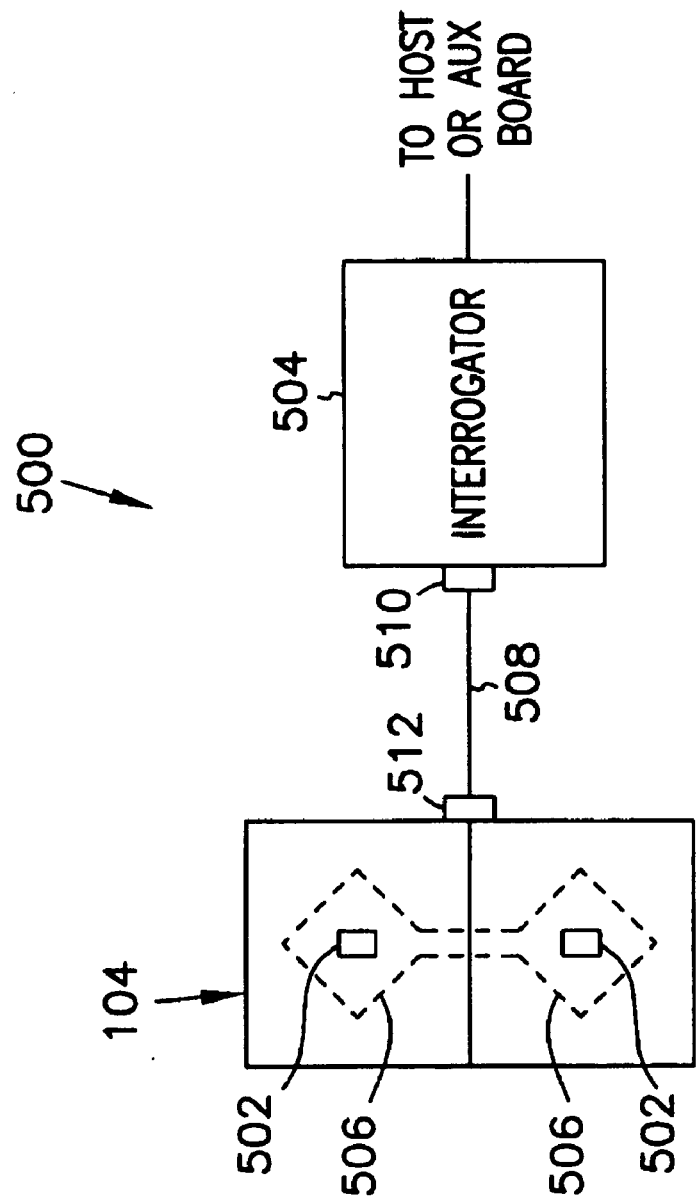
FIG. 8 is a block diagram of another embodiment of an interrogator system of the present invention.

An interrogator system embodiment 500 of the present invention as shown in FIG. 8 comprises tags 502 and an interrogator 504. Each tag 502 is associated with a specific lot, and contains identification information specific to the lot or item to which the tag is attached. Each tag 502 may be attached to a lot box or the like. Each tag, when excited, will communicate a signal indicative of its identification information. The tag can carry such information as a serial number and the like, which may be cross-referenced in a database maintained at the system host (computer). Antennas 506 are positioned in close proximity to the lot location which they will be polling. Interrogator 504 is connected to antennas 506 by a communication line 508, which in the example shown will be a four line conductor. Connection jacks 510 and 512 connect the communication line 508 to the interrogator 504 and the nesting station 506 respectively. As discussed above, a four line conductor will typically be terminated with an RJ-11 four conductor jack.

Tags 502, as has been mentioned above, are typically passive tags. This reduces the overall tag cost, which is important since a large number of tags may be required in application. The passive tags 502, which allow for low cost, generally have a short effective operating range. The range may be on the order of 0 to 15–20 inches, depending upon antenna size. The larger the antenna, the greater the operating range. In one embodiment, the present invention limits the tag range further, preferably on the order of two (2) inches. Taking advantage of this short range allows this embodiment of the present invention to excite a tag and obtain its information, while also determining its exact location. Further, with simple timing and recordation schemes, it is possible given the precise nature of multiple antenna locations and close discrimination between lots to know which part is at which exact location at any given time.

Each interrogator has an address stored in interrogator address module 417, which may be a volatile or a non-volatile memory. Each antenna connection has a sub-address.

Each antenna array location has its own unique identification information or address. In this way, the unique address can be programmed into the system, so that the physical location is not determined by where the antenna array is plugged in, but by what the address of the array has been programmed to. Then, under that address each antenna point will have its own address, allowing resolution down to each specific individual shelf and position. The system resolves exactly where each item is. This allows the mapping of a shelf and/or a location for a graphics display or the like, to locate an item with specificity. The reduced range of the antennas of this embodiment of the present invention allow for such a close up representation of exact item position. The range of on the order of two inches allows the reading of each tag to a precise location.

For example, in a wafer production fabrication, there may be 1000 lot boxes running production wafers, and 1000 lots of test wafers, plus 500 lots of reference type wafers, all at a general location. This results in 2500 lot boxes in a physical space. This can represent upwards of 5000 locations, because of the open queue space which is needed to move lots through such an operation. A system which works must be low cost and distributed to allow for multiple read locations, and inexpensive read points.

With a large number of locations to be polled, multiple interrogators will be required. Each interrogator concentrates multiple antenna locations into one interrogator. Typically in a wafer production line, production shelves are 2×4, or eight lots per shelf. Racks of shelves may be stacked six shelves high, and may have 32–56 boats per rack. Typically, the maximum number of boats per rack is 60. With two telephone cable per shelf, a single location may have 12 eight conductor flat cables running from the location to the interrogator. The benefits of local interrogators multiply with increased numbers of read locations.

With an interrogator having 60 antennas, 60 sets of data are collected and stored internally. At the next polling, only absolute differences are considered. That is, the delta data is polled. If only one of the sets of data has changed, it is the only set of data transmitted. This reduces the amount of data required to be transmitted. A complete polling may be taken at a specified interval or number of scans, in one embodiment every 100 scans. Further, tag information transmitted may be limited in one embodiment. Some tags contain an amount of user specific information that is the same for every tag associated with that user. If all tags polled are for a certain customer or user, then certain identification information need not be transmitted. Also, tags out of range of a certain specified parameter can be flagged, or an alarm can be given.

With 180 interrogators in a room, multiple options are available. First, all interrogators could be local, taking gathered information from its read locations or bays and sending the information into a switched multidrop configuration. This configuration would result in some data throughput difficulties (long time between individual location interrogation), but in a slow changing environment this may not be critical. Problems with such a multidrop configuration is that it places more equipment in the field, creating more service locations and an increased number of locations for things to break down. In one embodiment, communication drops to each interrogator are all sent back to a communications room in a star configuration which is in turn connected to the host. However, the scale could be dropped down to individual or a small number of components together on a power supply depending on the facility requirements.

Alternatively, an infrared link may be positioned on an interrogator, or located remote to an interrogator, and an infrared transceiver pod could be positioned on the ceiling of a room, for obtaining by infrared the location information gathered by each interrogator. Power would still need to be provided to each interrogator, most likely on a cable, but full data communication links to the host would not be required. Other technologies could also be supported, such as cellular phone, pager, wireless modem, solar power, and the like.

Figure 9:
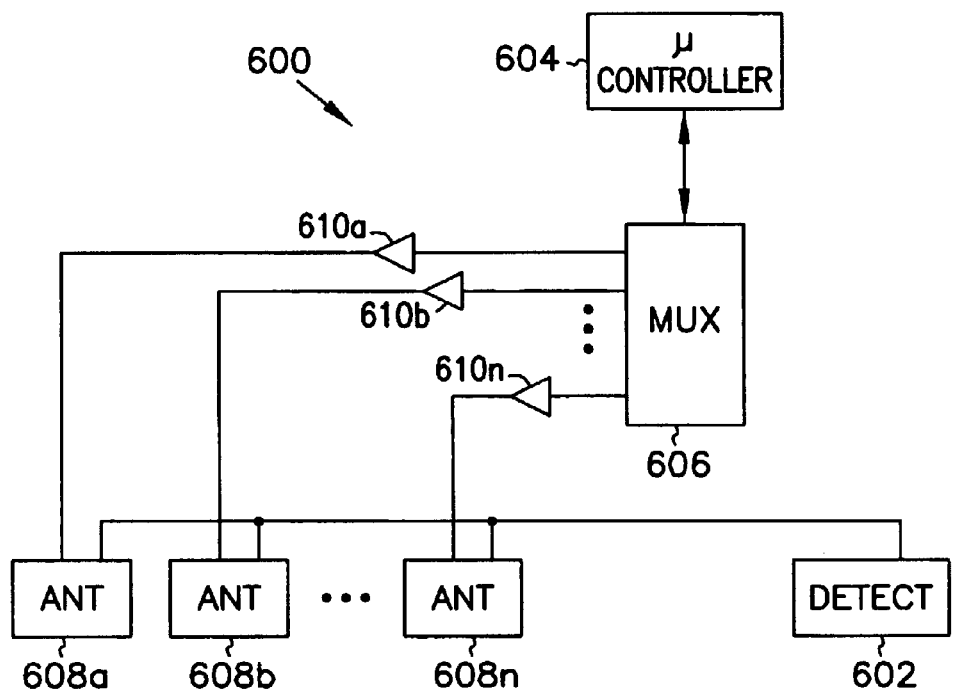
FIG. 9 is a block diagram of another system embodiment of the present invention.

FIG. 9 shows an embodiment 600 of another system embodying the present invention. Multiplexor 606 has a plurality of connections to single antennas 608a, 608b, . . . 608n, which are driven by drivers 610a, 610b, . . . 610n. A common detector circuit 602 is connected in parallel to each of the drivers 610a, 610b, . . . 610n and to controller 604. Controller 604 controls selection of which antenna 608 is to be active at any given time.

In embodiments of the invention as described above, the use of a flat coil antenna has been shown to allow some lateral movement of the boxes to allow for positioning tolerances without significant degradation of performance. Further, the flat coil antenna construction also provides relatively good height detection of the antenna without drastically affecting the performance of the system. A flat coil is more sensitive to ferrous materials in the vicinity of the coil. However, if the shelf or nesting station upon which tags are placed is composed of a material such as wood, plastic, and the like instead of metal, then a balance between separation of the antenna from the shelf and the performance of the antenna is not an issue.

If the height or distance of the antenna from the tag increases, the communication or readability degrades. As the height or distance decreases, the tuned circuit becomes detuned. Further, if a ferrous material object such as a wrench, clipboard, or pad is placed on or in close proximity to the nesting station or antenna, a voltage anomaly due to the object may show up in the output from the diode of the tuned circuit, and tag communication may degrade. At that point, it will be evident that the antenna is not sensing a tag, but instead is sensing something abnormal. For example, if no voltage is indicated in the tuned circuit, that could indicate that the antenna is not present, or that there is a fault in the circuit.

Changes in antenna performance or surrounding load will change the peak rectified voltage from the diode. This changed peak rectified voltage can be compared to historical data or absolute values to detect system faults or performance degradation.

Figure 10:
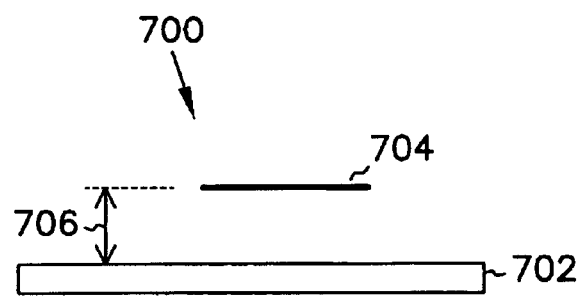
FIG. 10 is a side elevation view of an another antenna embodiment of the present invention.

An embodiment 700 of an antenna which decreases sensitivity to anomalies is shown in FIG. 10. A ferrous cover plate or metal sheet 702 is positioned a predetermined distance 706 from the back of the antenna 704. The metal sheet or cover 702 serves to magnetically preload the coil 704. This ferric loading of the coil serves to reduce the sensitivity of the antenna 704 to further surrounding metal. The tuned circuit, such as tuned circuit 300, is then tuned with the cover or metal sheet 702 in place. It has been determined that a preferable separation 706 between the antenna 704 and the plate or sheet 702 is approximately 3/8 of an inch. However, other distances will also serve to preload the tuned circuit.

Process Flow

Figure 11:
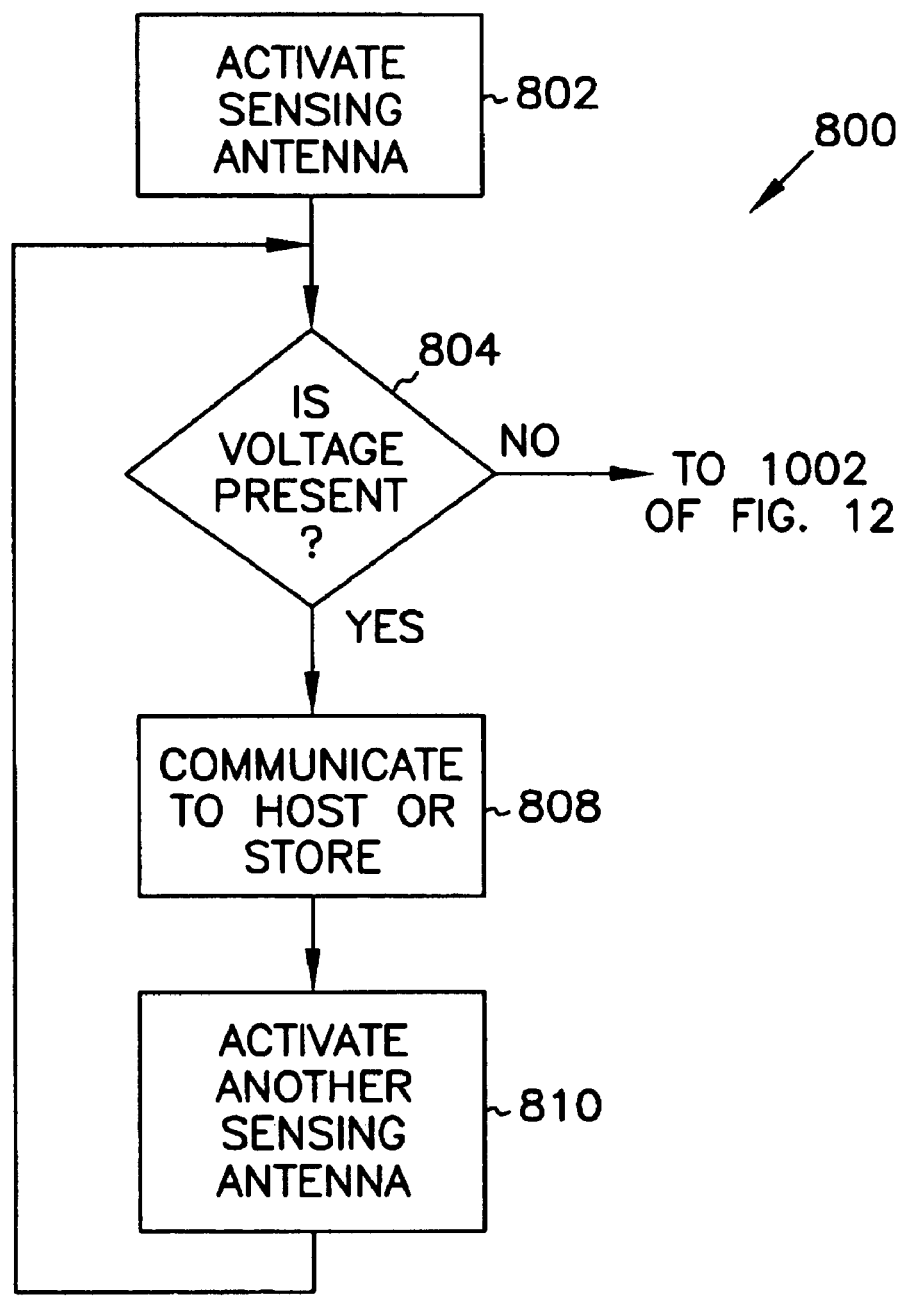
FIG. 11 is a flow chart diagram of a method embodiment of the present invention.

A method embodiment 800 of tracking the location of identification tags as shown in FIG. 11 comprises activating a sensing antenna, which is part of a tuned circuit, to excite a passive identification tag in block 802, determining if a voltage is induced in the sensing antenna in block 804, and storing or communicating to the host any induced voltage in the sensing antenna in block 808 if a voltage is induced in the sensing antenna.

An interrogator such as interrogator 400 described in detail above with included multiplexing capability controls multiple antennas all attached to the interrogator, with one antenna being driven at any given time. A detector circuit in the interrogator serves to detect the signals returned from the sensing antenna. The method 800 may further comprise activating a plurality of further sensing antennas in a predetermined or random sequence in block 810, followed by the re-execution of blocks 804 and 808 as needed.

The sensing antennas and interrogators described in detail above may be used in a tag identification method such as method 800. One or more processors in the interrogator may be used to not only decode data coming back from the detector circuit but also to provide sequential scanning of the ports. Process flow in method 800 allows for either scanning all antenna locations or ports regardless of whether anything is plugged into them. In other words, the sensing antenna, tuned circuit, and detector circuit determine whether an antenna is plugged into a location or not by measuring the voltage generated by the rectification of the tank circuit. This voltage is typically a nominal voltage stable across all antennas.

If no voltage is present in decision block 804, several options for further process flow are available, and will be described in detail below. If no voltage is present, that may indicate that no antenna is present. Alternatively, a lookup table or representation of the configuration of the antenna system may indicate that there should be an antenna at a given location. Further, when a tag powers up, it may not correctly initialize or communicate information. A reinitialization may be necessary. If no voltage is present in block 804, an alarm for an antenna failure or other alarm condition, such as antenna degradation or the like, can be generated. The host system can track antenna voltage and compare historical data to detect problems as discussed above.

A self-testing embodiment of a material tracking system is a part of the present invention. A self-testing embodiment 1000 is shown in detail in FIG. 12. Self-testing embodiment 1000 incorporates some of the basic process flow of embodiment 800. Embodiment 1000 comprises selecting a scan method from a number of possible scanning methods in block 1002, checking an antenna map or the like to allow skipping of inactive antennas in block 1004, and activating the selected antenna in block 802. If no antenna is supposed to be present, process flow can continue with the next antenna position. If the antenna voltage for the selected antenna does not exceed a predetermined lower limit as determined by decision block 1005, the host is alerted or a local alarm is activated in block 1020. If the antenna voltage for the selected antenna is above the predetermined lower limit as determined by decision block 1005, process flow continues with block 1006.

In block 1006, a timeout timer is reset. The timeout timer counts a predetermined time during which the embodiment 1000 waits for tag data to be read. The embodiment waits for tag data or the timeout limit of the timeout timer in block 1008. A determination is made as to whether tag data has been detected in decision block 1010. If tag data has been detected in block 1010, the data is stored or sent to the host in block 808, and the next antenna is selected in block 810. Following that, process flow continues with block 1004.

For each instance in which tag data is not detected, an iteration count is compared against an iteration limit in block 1012. A predetermined limit of the number of iterations allowed for detecting tag data is set in the embodiment 1000. This number may be set to depend on a number of factors, including the response time of the tags, the required or desired response time of the circuit, and the like. Each unsuccessful detection of tag data results in an incrementing of the iteration count. If no tag data has been detected in block 1010, the iteration count is checked against a predetermined iteration limit in decision block 1012. If the iteration count is not above the predetermined limit, the iteration counter is incremented in block 1016, and the antenna driver is cycled off and back on in block 1018. Process flow continues with decision block 1005. If the iteration count is above the predetermined iteration limit, then "no tag" data is generated in block 1014, and process flow continues with block 808. At the selection of the next antenna, the iteration count is reset.

Typically, a time period of approximately 50 milliseconds is enough to determine whether a signal will be present. This amounts to approximately two power cycles. If no tag is sensed, the typical scan time is approximately 0.1 seconds for each scan. In a worst case scenario, an entire shelf of 60 antennas with no tags can be scanned in approximately six (6) seconds. The fastest read conditions occur when all active antennas have tags present, and all tags properly power up.

Depending upon required response time, the ratio of read points to interrogators could be increased. At 60 to 1, scan time for a shelf is approximately 6 seconds. Increasing the read point to interrogator ratio to 500 to 1 or higher would push scan time to around a minute, which is still acceptable for numerous inventory functions.

Given the availability of polling a shelf of up to 60 positions in approximately six seconds, any number of possibilities of tracking procedures and other inventory control functions may be implemented in computer software. Currently, bar codes on lots are scanned with the information therefrom being stored in a database. The identification tags are generally molded into a wafer boat or box. Typically, the wafer box remains with the lot for most of the lot life except for a few times, for example, when the boxes are washed, or if the box gets contaminated.

Figures 13, 14:
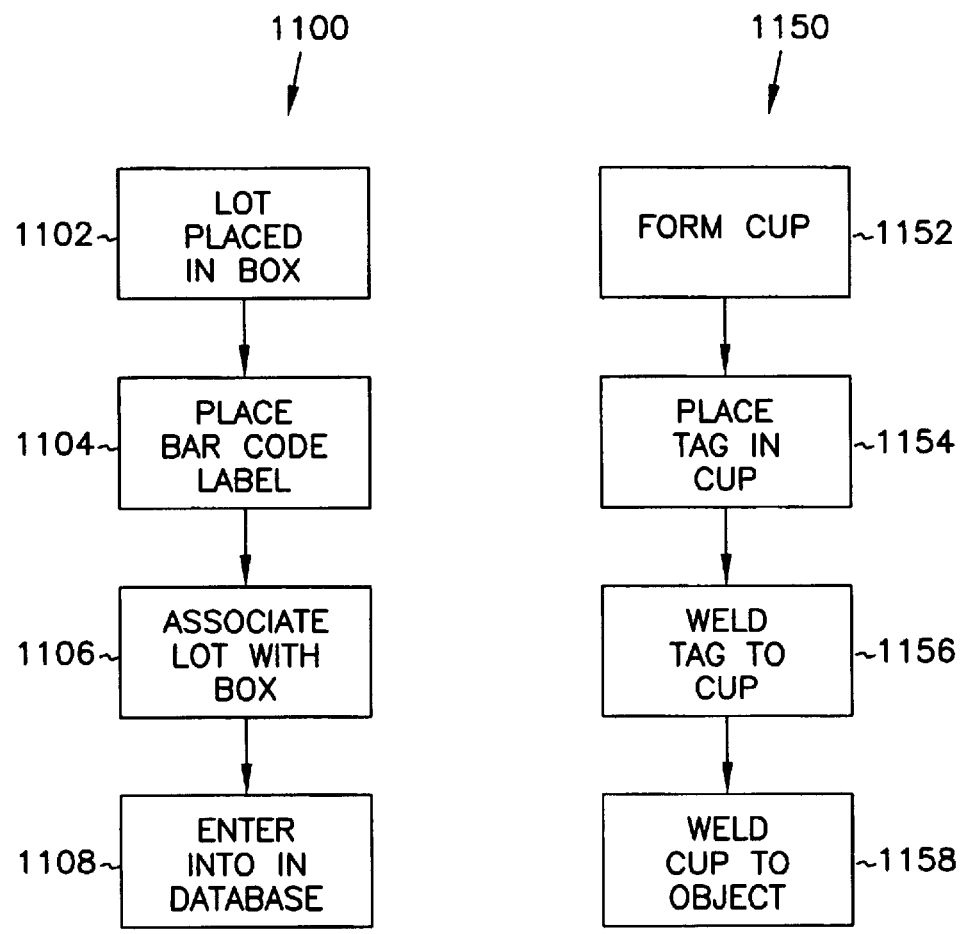
FIG. 13 is a flow chart diagram of a lot association method of the present invention.
FIG. 14 is a flow chart diagram of an embodiment of a tag attachment method of the present invention.

Another embodiment 1100 of the present invention for tracking the carrier box association to a lot is shown in FIG. 13. A lot is placed with a box in block 1102, and a bar code label is placed on the box in block 1104. The box is associated with the tag in block 1106. A database entry is made regarding the association in block 1108. This same database is used to record the sampling information generated at various polling locations around the plant or location in which a system embodiment of the present invention is in place.

Figure 13A:
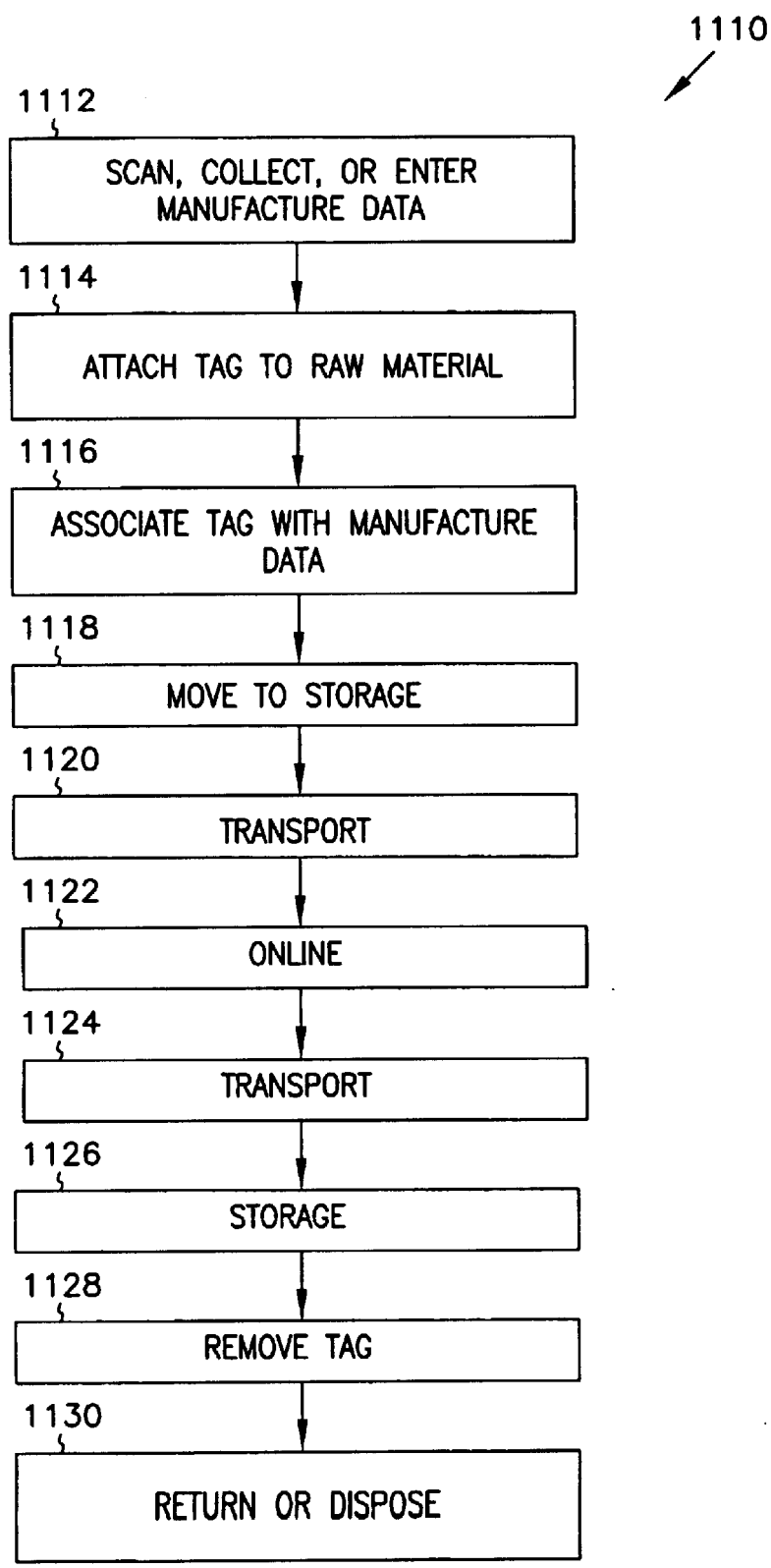
FIG. 13a is a flow chart diagram of another method of the present invention.

Yet another embodiment 1110 of the present invention for associating a tag with material and manufacturer information is shown in FIG. 13a. Method 1110 comprises scanning, collecting, or entering manufacturer data into a database in block 1112, attaching a tag to the raw material in block 1114, and associating the tag with the manufacturer data in block 1116. The material is moved to storage in block 1118, transported in block 1120, and is moved through a production line in block 1122. While in any phase of the process 1110, apparatus embodiments of the present invention may be used to track the location of the material. The material is transported again in block 1124, and again stored in block 1126. At the completion of the production cycle, the tag is removed in block 1128, and is disposed of or returned for reprogramming in block 1130.

An identification tag may be attached to an object to be tracked by method embodiment 1150 shown in FIG. 14. Method 1150 comprises forming a shallow polypropylene cup in block 1152, placing the identification tag in the polypropylene cup in block 1154, welding the identification tag to the polypropylene cup ultrasonically in block 1156, and welding the polypropylene cup to the object ultrasonically in block 1158.

The database generated from all of the association information of the tags and boxes in a particular database can be sampled to generate history information. It is envisioned that such a database will be accessible at multiple locations around a plant or inventory location. The database can be queried to generate the appropriate information. The possibilities are numerous given the present invention embodiments' ability to update information of a box approximately every 6 seconds. Information that could be tracked includes by way of example only, and not by way of limitation, timing a process, timing a transfer time from one location to another, tracking missing lots, tracking movement of lots, detecting when a tag is missing, and the like.

Further, the information in the database may be queried, and software written for managing product flow in a production area, scheduling, tracking, notification of arrival and departure, history, spare equipment inventory, and the like. The nearly real-time gathering of information allows vast flexibility limited only by the capabilities of the systems on which the software may be implemented.

Figure 12:
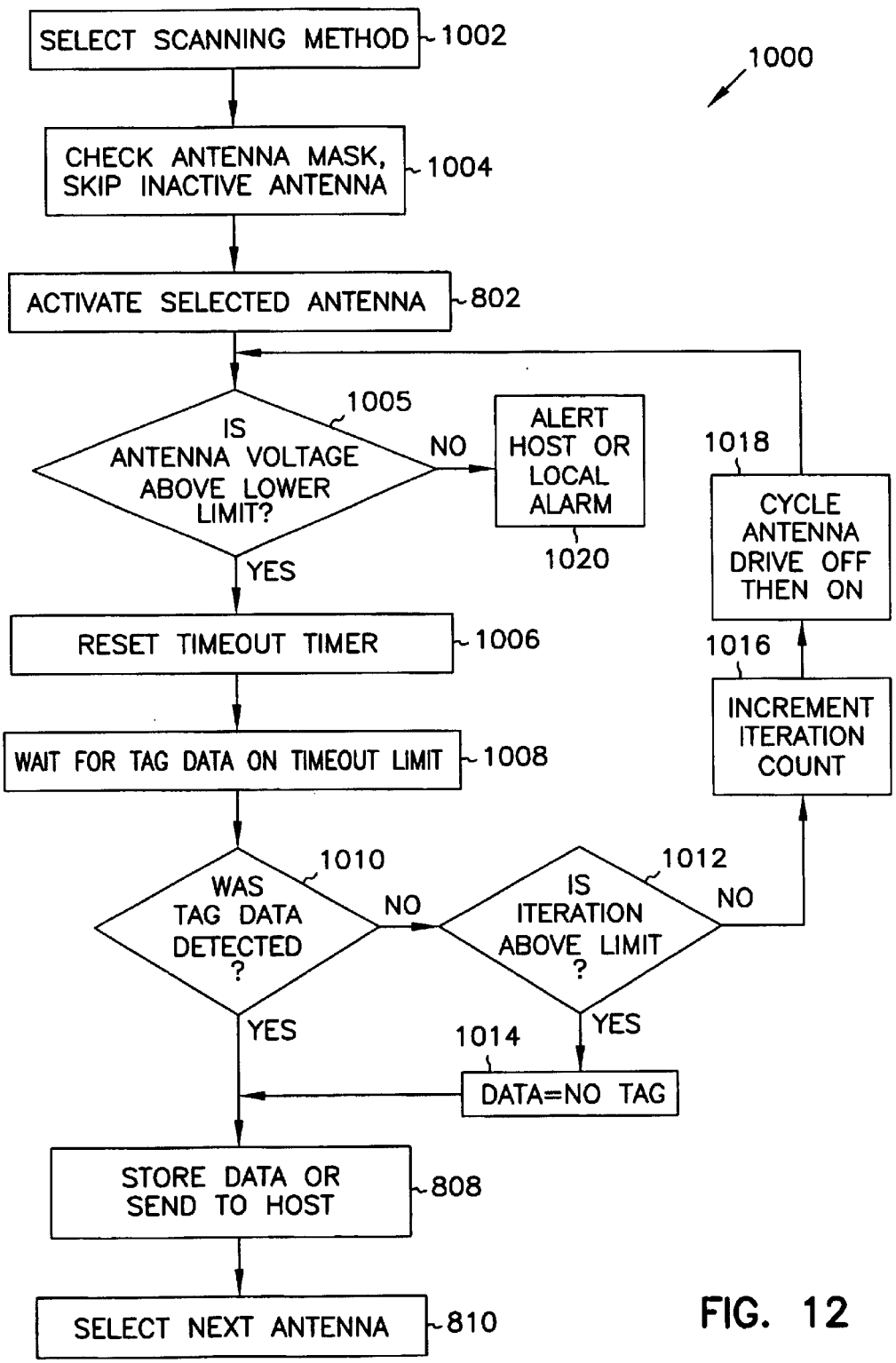
FIG. 12 is a flow chart diagram of another method embodiment of the present invention.
Figure 15:
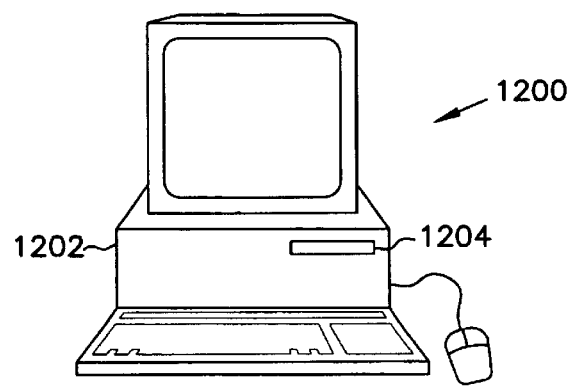
FIG. 15 is a perspective diagram of a computer system on which various embodiments of the present invention may be implemented.

The methods shown in FIGS. 11, 12, and 13 may be implemented in various embodiments in a machine readable medium comprising machine readable instructions for causing a computer 1200 such as is shown in FIG. 15 to perform the methods. The computer programs run on the central processing unit 1202 out of main memory, and may be transferred to main memory from permanent storage via disk drive 1204 when stored on removable media or via a network connection or modem connection when stored outside of the personal computer, or via other types of computer or machine readable medium from which it can be read and utilized.

Such machine readable medium may include software modules and computer programs. The computer programs comprise multiple modules or objects to perform the methods in FIGS. 11, 12, and 13, or the functions of various modules in the apparatuses of FIGS. 3, 7, 8, and 9. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware.

The software implementing the various embodiments of the present invention may be implemented by computer programs of machine-executable instructions written in any number of suitable languages and stored on machine or computer readable media such as disk, diskette, RAM, ROM, EPROM, EEPROM, or other device commonly included in a personal computer. Firmware can be downloaded by the host into the microcontroller or the auxiliary processor for implementing the embodiments of the invention.

Annunciator Design

Given a typical scan time for a shelf of approximately six seconds, a feedback mechanism such as an annunciator, bell, whistle, light, or the like could be used in a circuit such as circuit 150 shown in FIG. 4, that could be used to locate a lot or a specific part in a lot location. A representation such as a graphical representation of a shelf, could be employed at a visual display terminal, with the exact location of a certain identified part to be shown on the display, Such representation, due to the close detail allowed by the present invention, would facilitate pinpointing the location of an item or lot for easy retrieval of the part or item.

A coordinate mapping system could be used with graphics on a computer screen, including a number for elevation of a particular shelf in a stack, and a standard position for the shelf, for example an XY scheme with shelf number and position.

Figure 16:
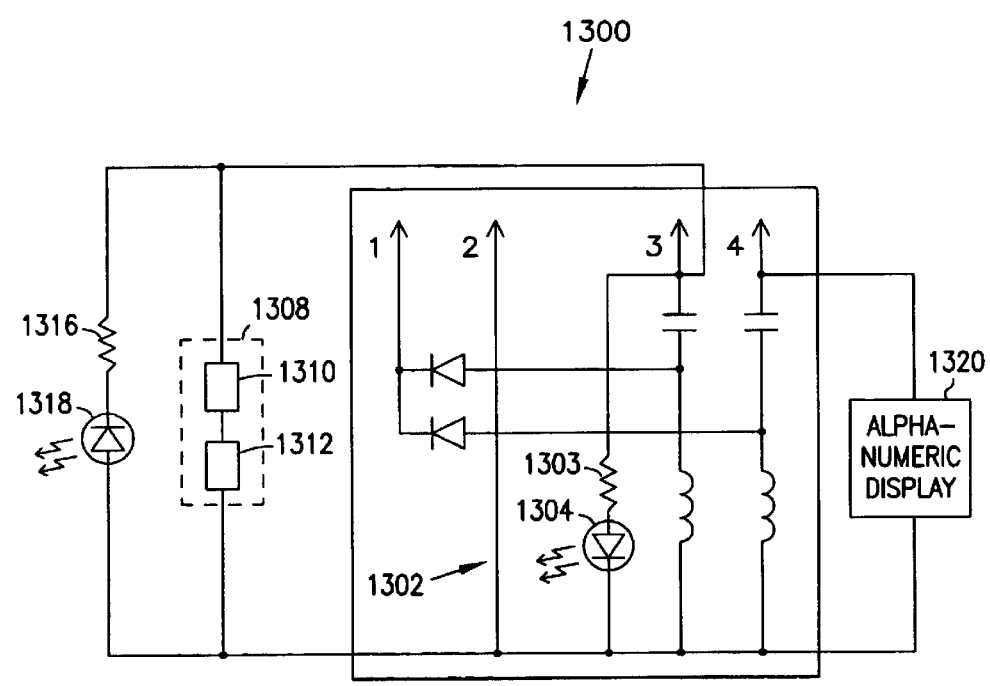
FIG. 16 is a schematic diagram of annunciator embodiments of the present invention.

An annunciator embodiment 1300 of the present invention is shown in FIG. 16. A variety of different annunciator type configurations are shown in FIG. 16. For example, one annunciator embodiment 1302 comprises a resistor 1303 and a light emitting diode 1304 connected in series across the incoming square wave signal. The annunciator embodiment 1302 will light the LED 1304 when the shelf or lot location to which the annunciator embodiment 1302 is connected is polled.

Another annunciator embodiment 1308 comprises a tuned circuit connected across an incoming square wave, the tuned circuit having a different resonance frequency than the resonance frequency of the tuned circuit used as a sensing antenna. Annunciator embodiment 1308 comprises a tuned LC circuit 1310 and an indicator 1312. Indicator 1312 will become activated when the shelf or lot location to which the annunciator embodiment 1308 is connected is polled with the alternate frequency.

In another annunciator embodiment 1316, a signaling LED 1318 is shown in reverse polarity. In normal operation, suppose that ground is connected to positive, and a bipolar driver sends a drive signal to an antenna. Switching the drive circuit or the ground polarity allows a pulsing reverse bias causing LED 1318 to light. In normal connections, with a positive bias on LED 1318, it is not lit. Placing a reverse bias on the annunciator embodiment 1316 causes LED 1318 to light.

In another embodiment, an alphanumeric display 1320 is operatively connected across an incoming square wave. The display 1320 can derive power from the line, or power can be externally provided. When the line is not used for driving an antenna, the display 1320 is recognized by the system, and the display may be used to display tag information such as the tag number, lot number, and the like. Once the tag information is decoded, the path to the host of the microcontroller could shut off the antenna, and an ASCII signal could be sent on a non-LC frequency. The display recognizes valid data and displays the data.

Primary application of the embodiments of the present invention are seen in wafer applications. However, multiplexing antennas offers a wide variety of other potential applications such as in large parking lots where RFID tags are placed at front or rear bumpers of vehicles, for example, and antennas are placed at the end of the parking space for identification of location and identity of vehicles. Other uses for the present invention include inventory control systems with large numbers of points to be inventoried but not requiring immediate scanning. Another example is material on a conveyer belt for objects that are momentarily stationary or stationary within approximately a ten second or longer period. Such modifications, variations, and other uses will be apparent to one of skill in the art, and are within the scope of the present invention.

Figure 17:
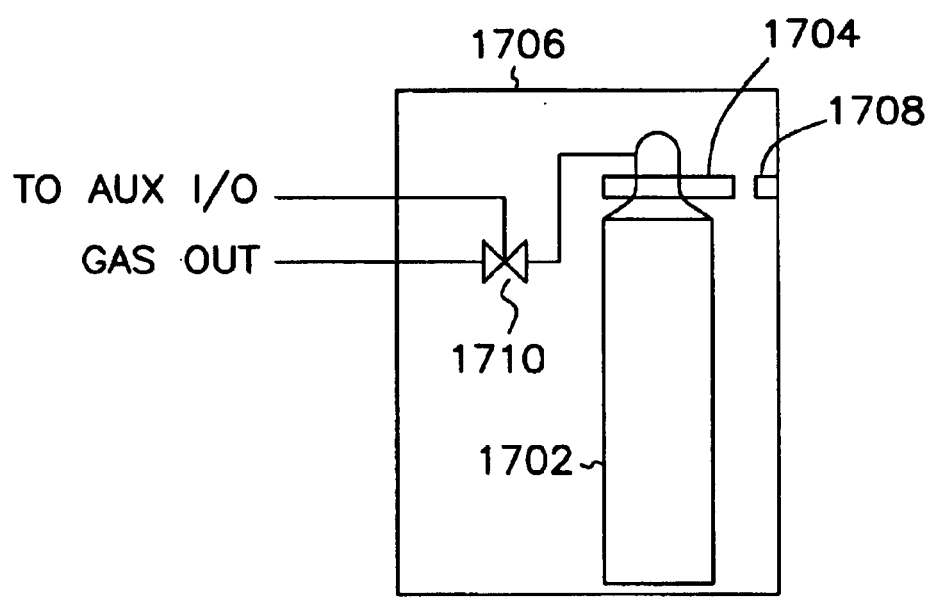
FIG. 17 is a block diagram of another embodiment of an application for the present invention.

For example, another embodiment of an application 1700 for the present invention is shown in FIG. 17. Tracking of raw material such as gas bottles, chemical bottles such as gas container 1702 is accomplished using an omnidirectional tag 1704 situated around the neck of a canister 1702 contained in a cabinet or other enclosure 1706. An antenna 1708 connected to a system such as those discussed above receives information from collar or tag 1704 upon polling of the tag location. An auxiliary I/O control such as control 421 is used to actuate a valve 1710 to dispense gas from the container 1702. The auxiliary control controls the gas flow, rate of dispensation, and the like.

Manufacture of the Nesting Stations

Physical implementation of the nesting stations may vary. One implementation is to use a clamshell-type plastic molding with molded ridges, stiffeners and anchor points molded directly into the plastic. The circuit board for the tuned tank includes the capacitors with the connection jacks mounted directly on the circuit board. The circuit board lays in a notch in the top half of the assembly. The metal ground plane plate is placed in the bottom half of the assembly. The antenna coil leads are attached to the circuit board while the antenna coil would be attached to the top half of the molding. A foam filler fills then fills the void and the molding is closed. The assembly of this type is key to keeping the cost low. The configurations allowed by this type of assembly cover very diverse arrangements.

CONCLUSION

The embodiments of the present invention have added multiplexing circuitry to an interrogator, allowing a single detection circuit and processor to be common to a plurality of antennas. A control module or host is used to control the driving of the antennas.

The embodiments of the present invention take advantage of a short range of a sensing antenna to distinguish multiple lots which may be placed very close together in a small area. One interrogator can distinguish many items. The invention has a low cost per read station, which is beneficial due to the large number of read locations.

What is claimed is:

1. An alert apparatus for an RFID tracking system, the alert apparatus comprising:
    a tuned circuit comprising an inductor and a capacitor tuned to a tuned frequency;
    a resistor; and
    a light emitting diode connected in series with the resistor, wherein the series connection of the resistor and the light emitting diode is connected across the tuned circuit.

2. The alert apparatus of claim 1, wherein the capacitor has a capacitance of about 3000 picofarads and the inductor has an inductance of about 800 microhenrys.

3. The alert apparatus of claim 1, wherein the alert apparatus is connected to a lot location configured to be monitored by the RFID tracking system.

4. An alert apparatus for an RFID tracking system having a tuned circuit, the alert apparatus comprising:
    a second tuned circuit, connected across the input to the RFID system tuned circuit, the second tuned circuit tuned to a different frequency than the RFID system tuned circuit, the second tuned circuit comprising:
    a capacitor; and
    an inductor and an indicator connected in parallel, the inductor and indicator parallel connection connected in series with the capacitor.

5. The alert apparatus of claim 4, wherein the tuned circuit of the RFID tracking system is an LC circuit with a capacitance of about 3000 picofarads and an inductance of about 800 microhenrys.

6. The alert apparatus of claim 4, wherein the alert apparatus is connected to a lot location configured to be monitored by the RFID tracking system.

7. An alert apparatus for an RFID tracking system, the alert apparatus comprising:
    a tuned circuit including a sensing antenna and having a tuned frequency; and
    an alphanumeric display operatively coupled across an input to the tuned circuit.

8. The alert apparatus of claim 7, wherein the tuned frequency is about 125 kHz.

9. The alert apparatus of claim 7, wherein the alert apparatus is connected to a lot location configured to be monitored by the RFID tracking system.

10. The alert apparatus of claim 7, wherein the alert apparatus further includes a power source for the alphanumeric display, the power source separate from the input to the tuned circuit.

11. The alert apparatus of claim 7, wherein the alphanumeric display is configured to receive an ASCII signal at a frequency other than the tuned frequency to display tag information related to a tag tracked by the sensing antenna.

12. An alert apparatus for an RFID tracking system having a plurality of sensing antennas, the alert apparatus comprising:
   a coordinate mapping system coupled to the RFID tracking system;
   a computer coupled to the coordinate mapping system, the computer system configured with a graphics display representative of the RFID tracking system to provide a visual indication of a sensing antenna scanning a location identified by the coordinate mapping system; and
   a plurality of annunciators, each annunciator to attach to a nesting station adapted for mounting a sensing antenna of the plurality of sensing antenna, wherein each sensing antenna is configured as an element of a tuned circuit to operate at a tuned frequency.

13. The alert apparatus of claim 12, wherein the coordinate mapping system is configured to provide location information of a sensing antenna in response to the RFID tracking system activating the sensing antenna.

14. The alert apparatus of claim 12, wherein the computer is configured to provide a visual indication of a sensing antenna scanning a location identified by the coordinate mapping system in response to the RFID tracking system activating the sensing antenna.

15. The alert apparatus of claim 12, wherein the computer is configured to display a visual indication of a sensing antenna scanning a location in terms of a stack of shelves and a shelf in the stack of shelves.

16. An alert apparatus for an RFID tracking system, the alert apparatus comprising:
   a tuned circuit including a sensing antenna and having a tuned frequency;
   a resistor;
   a light emitting diode connected in series with the resistor, the series connection of the resistor and the light emitting diode connected across the tuned circuit;
   a computer coupled to an interrogator of the RFID tracking system, the interrogator driving the tuned circuit, the computer system configured with a graphics display representative of the RFID tracking system; and
   a coordinate mapping system operatively coupled to the computer, wherein the coordinate mapping system is configured to provide location information of the sensing antenna.

17. The alert apparatus of claim 16, wherein the tuned frequency is about 125 kHz.

18. The alert apparatus of claim 16, wherein the tuned circuit, the resistor, and the light emitting diode are connected to a lot location configured to be monitored by the RFID tracking system.

19. The alert apparatus of claim 16, wherein the coordinate mapping system is configured to provide location information of the sensing antenna in response to the RFID tracking system activating the sensing antenna.

20. The alert apparatus of claim 16, wherein the computer is configured to provide a visual indication of the sensing antenna scanning a location identified by the coordinate mapping system in response to the RFID tracking system activating the sensing antenna.

21. The alert apparatus of claim 16, wherein the computer is configured to display a visual indication of the sensing antenna scanning a location in terms of a stack of shelves and a shelf in the stack of shelves.

22. An alert apparatus for an RFID tracking system, the alert apparatus comprising:
   a second tuned circuit connected across an input to a tuned circuit of the RFID tracking system, the tuned circuit of the RFID tracking system including a sensing antenna, the second tuned circuit tuned to a different frequency than the tuned circuit of the RFID tracking system, the second tuned circuit including a capacitor and inductor;
   an indicator connected in series with the second tuned circuit, the series connection of the indicator and the second tuned circuit connected across the tuned circuit of the RFID tracking system;
   a computer coupled to an interrogator of the RFID tracking system, the interrogator driving the tuned circuit of the RFID tracking system, the computer system configured with a graphics display representative of the RFID tracking system; and
   a coordinate mapping system operatively coupled to the computer, wherein the coordinate mapping system is configured to provide location information of the sensing antenna.

23. The alert apparatus of claim 22, wherein the tuned circuit of the RFID tracking system is an LC circuit with a capacitance of about 3000 picofarads and an inductance of about 800 microhenrys.

24. The alert apparatus of claim 22, wherein the second tuned circuit and the indicator are connected to a lot location configured to be monitored by the RFID tracking system.

25. The alert apparatus of claim 22, wherein the coordinate mapping system is configured to provide location information of the sensing antenna in response to the RFID tracking system activating the sensing antenna.

26. The alert apparatus of claim 22, wherein the computer is configured to provide a visual indication of the sensing antenna scanning a location identified by the coordinate mapping system in response to the RFID tracking system activating the sensing antenna.

27. The alert apparatus of claim 22, wherein the computer is configured to display a visual indication of the sensing antenna scanning a location in terms of a stack of shelves and a shelf in the stack of shelves.

28. An alert apparatus for an RFID tracking system, the alert apparatus comprising:
   a tuned circuit including a sensing antenna and having a tuned frequency;
   an alphanumeric display operatively coupled across an input to the tuned circuit;
   a computer coupled to an interrogator of the RFID tracking system, the interrogator driving the tuned circuit, the computer system configured with a graphics display representative of the RFID tracking system; and
   a coordinate mapping system operatively coupled to the computer, wherein the coordinate mapping system is configured to provide location information of the sensing antenna.

29. The alert apparatus of claim 28, wherein the tuned frequency is about 125 kHz.

30. The alert apparatus of claim 28, wherein the tuned circuit and the alphanumeric display are connected to a lot location configured to be monitored by the RFID tracking system.

31. The alert apparatus of claim 28, wherein the alphanumeric display is configured to receive an ASCII signal at a frequency other than the tuned frequency to display tag information related to a tag tracked by the sensing antenna.

32. The alert apparatus of claim 28, wherein the coordinate mapping system is configured to provide location information of the sensing antenna in response to the RFID tracking system activating the sensing antenna.

33. The alert apparatus of claim 28, wherein the computer is configured to provide a visual indication of the sensing antenna scanning a location identified by the coordinate mapping system in response to the RFID tracking system activating the sensing antenna.

34. The alert apparatus of claim 28, wherein the computer is configured to display a visual indication of the sensing antenna scanning a location in terms of a stack of shelves and a shelf in the stack of shelves.

35. An alert apparatus for an RFID tracking system, the alert apparatus comprising:
   a tuned circuit including a sensing antenna, the tuned circuit responsive to a signal from a bipolar driver circuit;
   a resistor; and
   a light emitting diode connected in series with the resistor, the series combination of the resistor and the light emitting diode coupled across the tuned circuit, wherein the light emitting diode is configured with reverse polarity with respect to the tuned circuit.

36. The alert apparatus of claim 35, wherein the tuned circuit of the RFID tracking system is an LC circuit with a capacitance of about 3000 picofarads and an inductance of about 800 microhenrys.

37. The alert apparatus of claim 35, wherein the alert apparatus is connected to a lot location configured to be monitored by the RFID tracking system.

38. The alert apparatus of claim 35, wherein the bipolar driver circuit is configured to apply a reverse bias to the light emitting diode during a scan operation of the sensing antenna.

* * * * *